US012662252B2

(12) United States Patent
Pons et al.

(10) Patent No.: US 12,662,252 B2
(45) Date of Patent: Jun. 23, 2026

(54) ALVEOLAR STRUCTURE OF AN ACOUSTIC DAMPING PANEL COMPRISING AT LEAST ONE ATTACHED ELEMENT CONFIGURED FOR VIBRATING AT A DESIRED FREQUENCY, METHOD FOR PRODUCING SAID ALVEOLAR STRUCTURE

(71) Applicants: Airbus SAS, Blagnac (FR); Airbus Operations SAS, Toulouse (FR)

(72) Inventors: François Pons, Toulouse (FR); Laurent Cazeaux, Toulouse (FR); Arnulfo Carazo Mendez, Toulouse (FR); Florent Mercat, Toulouse (FR); Alexandre Bellanger, Toulouse (FR); Laurent Presseq, Toulouse (FR); Maxime Gauthier, Toulouse (FR); Manuel Teigne, Toulouse (FR); Philippe Wessel, Toulouse (FR); Joelle Bonnefont, Toulouse (FR)

(73) Assignees: AIRBUS SAS, Blagnac (FR); AIRBUS OPERATIONS SAS, Toulouse (FR)

( * ) Notice: Subject to any disclaimer, the term of this patent is extended or adjusted under 35 U.S.C. 154(b) by 184 days.

(21) Appl. No.: 18/425,129

(22) Filed: Jan. 29, 2024

(65) Prior Publication Data
US 2024/0253803 A1 Aug. 1, 2024

(30) Foreign Application Priority Data
Jan. 31, 2023 (FR) ...................................... 2300864

(51) Int. Cl.
*B64D 33/02* (2006.01)

(52) U.S. Cl.
CPC ...... *B64D 33/02* (2013.01); *B64D 2033/0206* (2013.01)

(58) Field of Classification Search
CPC ..... G10K 11/162; H04R 1/02; H04R 2201/02
See application file for complete search history.

(56) References Cited

U.S. PATENT DOCUMENTS 4,373,608 A * 2/1983 Holmes ..................... F16F 7/10
181/208
5,180,619 A 1/1993 Landi et al.
(Continued)

FOREIGN PATENT DOCUMENTS

CN 113785113 A 12/2021
EP 3194681 B1 7/2018
(Continued)

OTHER PUBLICATIONS

French Search Report for corresponding French Patent Application No. 2300864 dated Jul. 19, 2023.

*Primary Examiner* — Forrest M Phillips
(74) *Attorney, Agent, or Firm* — Greer, Burns & Crain, Ltd.

(57) ABSTRACT

An alveolar structure of an acoustic damping panel which is configured for damping at least one sound wave of a sound frequency, wherein the alveolar structure comprises at least one attached element, separate from partitions, and configured for vibrating at a frequency substantially equal to the sound frequency of the sound wave to be damped. Also a method for producing such an alveolar structure, an acoustic damping panel comprising at least one such alveolar structure, and an aircraft comprising at least one such acoustic damping panel.

17 Claims, 4 Drawing Sheets

(56) References Cited

U.S. PATENT DOCUMENTS

| | | | | |
|---|---|---|---|---|
| 9,303,588 | B2 * | 4/2016 | Pongratz | F02C 7/24 |
| 11,441,515 | B2 * | 9/2022 | Murray | F02K 1/827 |
| 11,524,637 | B2 * | 12/2022 | Chang | B60R 13/0884 |
| 12,106,744 | B2 * | 10/2024 | Ravise | B32B 5/18 |
| 2012/0285768 | A1 | 11/2012 | Douglas et al. | |
| 2015/0068834 | A1 * | 3/2015 | Barrett | F01N 1/026 |
| | | | | 181/213 |
| 2017/0191414 | A1 | 7/2017 | Martinez et al. | |
| 2017/0259520 | A1 | 9/2017 | Alter et al. | |
| 2019/0213990 | A1 * | 7/2019 | Jonza | B32B 3/266 |
| 2021/0277829 | A1 | 9/2021 | Van Ness et al. | |
| 2022/0145797 | A1 | 5/2022 | Pierick et al. | |
| 2022/0186667 | A1 * | 6/2022 | Riou | F02K 1/827 |
| 2022/0199064 | A1 * | 6/2022 | Quesada | G10K 11/168 |
| 2022/0293077 | A1 | 9/2022 | Ravise et al. | |

FOREIGN PATENT DOCUMENTS

| | | | |
|---|---|---|---|
| EP | 3618056 | A2 | 3/2020 |
| EP | 2418641 | B1 | 1/2021 |
| JP | H0739968 | A | 2/1995 |

* cited by examiner

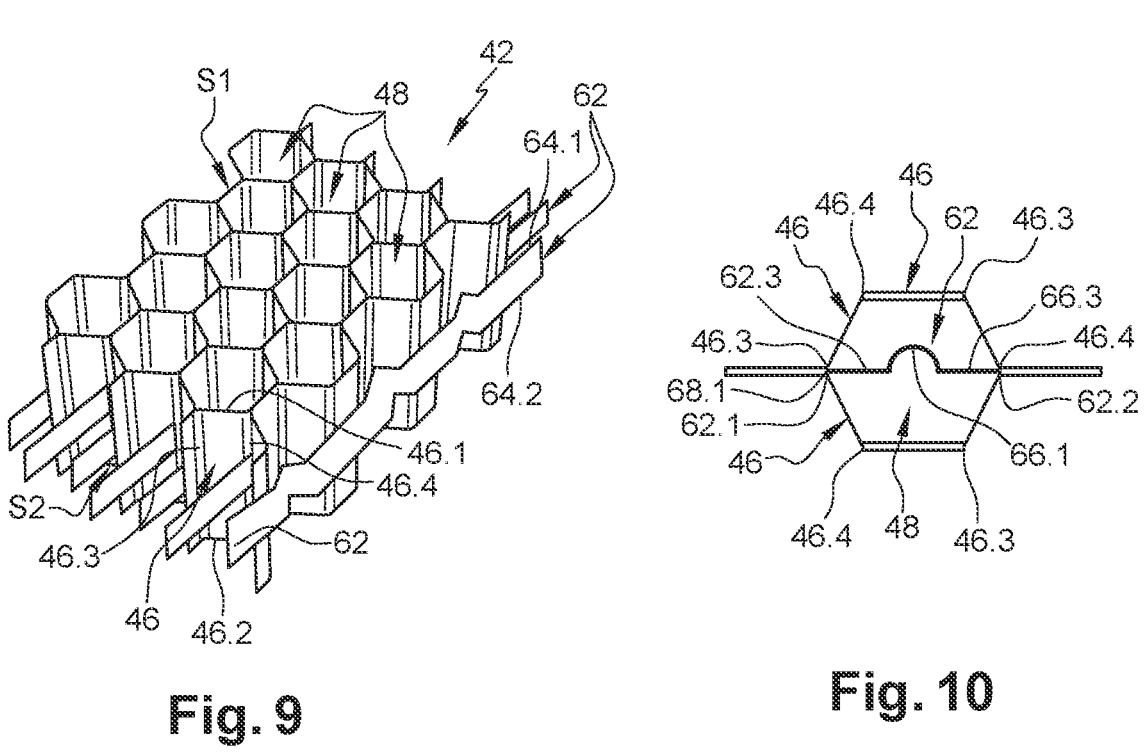
Fig. 9
Fig. 10
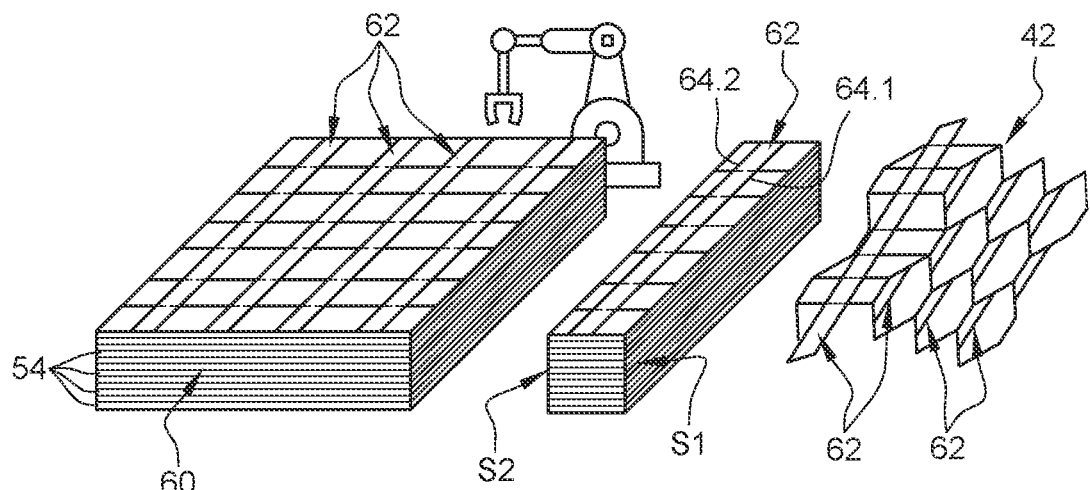
Fig. 11
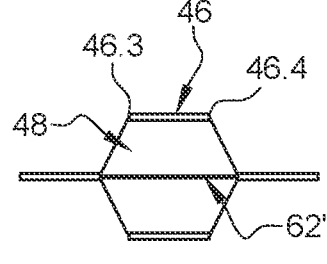
Fig. 12
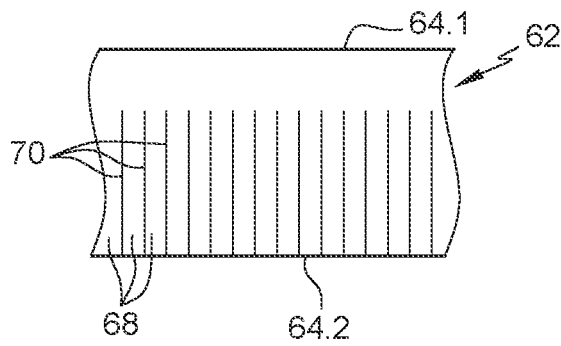
Fig. 13

ALVEOLAR STRUCTURE OF AN ACOUSTIC
DAMPING PANEL COMPRISING AT LEAST
ONE ATTACHED ELEMENT CONFIGURED
FOR VIBRATING AT A DESIRED
FREQUENCY, METHOD FOR PRODUCING
SAID ALVEOLAR STRUCTURE

CROSS-REFERENCES TO RELATED
APPLICATIONS

This application claims the benefit of French Patent
Application Number 2300864 filed on Jan. 31, 2023, the
entire disclosure of which is incorporated herein by way of
reference.

FIELD OF THE INVENTION

The present invention concerns an alveolar structure of an
acoustic damping panel comprising at least one attached
element configured for vibrating at a desired frequency, and
a method for producing said alveolar structure. The inven-
tion also concerns an acoustic damping panel comprising at
least one such alveolar structure, and an aircraft comprising
at least one such acoustic damping panel.

BACKGROUND OF THE INVENTION

According to an embodiment of the prior art, a propulsion
unit comprises a nacelle and a turbofan engine positioned
inside the nacelle. Certain surfaces of the nacelle and the
turbofan engine comprise acoustic damping panels for
damping nuisance noise. According to an embodiment vis-
ible in FIG. 1, an acoustic damping panel 10 comprises at
least one permeable layer 12, at least one alveolar structure
14 and a solid layer 16. In the remainder of the description,
a layer is described as permeable if it is porous or comprises
openings or holes passing through it.

Such an acoustic panel 10 uses the principle of a Helm-
holtz resonator. Thus the alveolar structure 14 has cells 14.1,
the volume of which is adjusted as a function of the
frequency range of the sound waves to be damped.

For certain frequencies, the acoustic damping panel 10
has a single alveolar structure 14, as illustrated in FIG. 1. For
other frequencies, in particular low frequencies, the acoustic
damping panel 10 may comprise two superposed alveolar
structures separated by a permeable layer.

These acoustic damping panels offer relatively good per-
formance for a given frequency range situated in the high
frequencies. In order to damp different frequency ranges,
some of which are situated in the low frequencies, it is
necessary to provide acoustic damping panels with different
thicknesses, in particular acoustic damping panels with a
large thickness suitable for low frequencies, which has
undesirable consequences in terms of mass, bulk and pro-
duction.

SUMMARY OF THE INVENTION

The present invention is intended to overcome some or all
of the drawbacks in the prior art.

To this end, the invention concerns an alveolar structure
of an acoustic damping panel which is configured for
damping at least one sound wave of given sound frequency,
the alveolar structure extending between first and second
surfaces, the alveolar structure comprising a plurality of
cells separated by partitions which each have a first edge at the first surface, a second edge at the second surface, and
third and fourth edges connecting the first and second edges.

According to the invention, the alveolar structure com-
prises at least one attached element, separate from the
partitions and configured for vibrating at a frequency sub-
stantially equal to the sound frequency of the sound wave to
be damped.

Using an alveolar structure with a relative small and
constant thickness, this solution allows damping of sound
waves over several frequency ranges, in particular at least
one in the low frequencies.

According to another characteristic, the attached element
is a tab having a first end connected to a partition of the
alveolar structure, and a free second end, said tab being
configured for vibrating at a frequency substantially equal to
the sound frequency of the sound wave to be damped.

According to another characteristic, the alveolar structure
comprises three tabs fixed to the same partition and aligned
in a direction substantially parallel to the third and fourth
edges of the partition, approximately centered between these
third and fourth edges and evenly distributed between the
first and second edges.

According to another characteristic, the partitions each
have a length measured in a direction parallel to the third and
fourth edges, and a width measured in a direction parallel to
the first and second edges. In addition, each tab has a first
part pressed against and fixed to the partition and extending
from the first end, and a second part detached from the
partition and extending from the second end, the first and
second parts being separated by a fold line, wherein each tab
has a thickness of the order of 50 to 500 μm, a constant width
of the order of 10 to 90% of the width of the partitions, the
second part having a length of the order of 5 to 80% of the
length of the partitions.

According to another characteristic, the alveolar structure
comprises single partitions each comprising a single layer of
material, and double partitions each comprising two layers
of material glued together. In addition, all single partitions of
at least one considered zone of the alveolar structure each
comprise at least one tab.

According to another characteristic, the attached element
is a material strip having two ends connected to the parti-
tions of the alveolar structure and passing through at least
one cell, said material strip being configured for vibrating at
a frequency substantially equal to the sound frequency of the
sound wave to be damped.

According to another characteristic, the material strip has
upper and lower edges which are substantially parallel with
one another and with the first and second edges of the
partitions.

According to another characteristic, for each cell of the
alveolar structure through which it passes, the material strip
has an over-length allowing it to vibrate.

According to another characteristic, each material strip
has a height substantially equal to one third of that of the
partitions, and a thickness of the order of 20 to 500 μm, each
material strip having, in each cell through which it passes, a
curved central part and first and second side parts which are
flat and coplanar and arranged on either side of the central
part.

According to another characteristic, each material strip is
flat and has fringes.

According to another characteristic, the alveolar structure
comprises several material strips passing through all cells of
at least one considered zone of the alveolar structure.

According to another characteristic, the alveolar structure
comprises at least first and second zones, the first zone being configured for damping at least one sound wave having a first sound frequency, the second zone being configured for damping at least one sound wave having a second sound frequency different from the first sound frequency; the alveolar structure comprising in the first zone at least one attached element separate from the partitions and configured for vibrating at a frequency substantially equal to the first sound frequency.

According to another characteristic, at least one partition of the second zone has at least one cavity configured such that said partition of the second zone vibrates at a frequency substantially equal to the second sound frequency.

According to another characteristic, the alveolar structure comprises, in the second zone, at least one attached element separate from the partitions and configured for vibrating at a frequency substantially equal to the second sound frequency.

The invention also concerns a method for producing an alveolar structure according to one of the preceding characteristics, the production method comprising a step of cutting out sheets, steps of folding and gluing the sheets, a step of stacking the sheets so as to obtain a stack of sheets, and a step of stretching the stack so as to obtain the alveolar structure. According to the invention, the production method comprises a step of positioning the produced separate elements on each sheet before the stacking step or alternately with the stacking step, the attached elements being positioned after depositing of a new sheet.

The invention also concerns an acoustic damping panel comprising at least one alveolar structure according to one of the preceding characteristics, and an aircraft comprising at least one such acoustic damping panel.

BRIEF DESCRIPTION OF THE DRAWINGS

Further features and advantages will become apparent from the following description of the invention, which description is given solely by way of example, with reference to the appended drawings in which:

FIG. 9 is a perspective view of an alveolar structure comprising vibrating material strips, illustrating another embodiment of the invention, FIG. 10 is a top view of the alveolar structure visible in FIG. 9, FIG. 11 is a schematic depiction of the various steps of a method for producing an alveolar structure as visible in FIG. 9, FIG. 12 is a top view of a cell of an alveolar structure comprising a material strip with fringes, illustrating another embodiment of the invention, FIG. 13 is a side view of a material strip with fringes, illustrating an embodiment of the invention.

DETAILED DESCRIPTION OF THE PREFERRED EMBODIMENTS

Figures 1, 2, 3, 4:
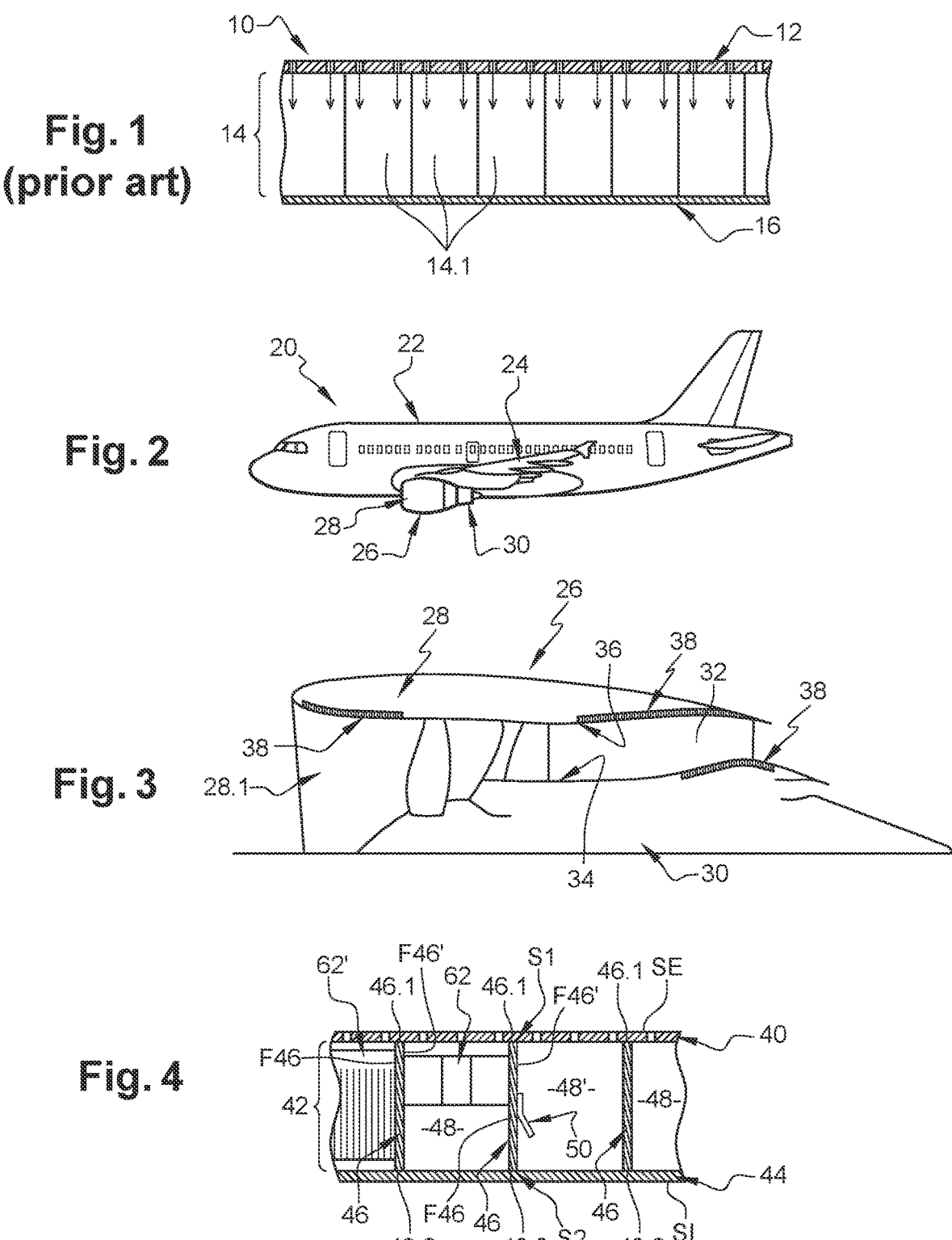
FIG. 1 is a longitudinal section of a part of an acoustic damping panel, illustrating one embodiment of the prior art.
FIG. 2 is a side view of an aircraft.
FIG. 3 is a longitudinal half-sectional view of a propulsion unit of an aircraft.
FIG. 4 is a longitudinal sectional view of a part of an acoustic damping panel comprising attached elements configured for vibrating at a desired frequency, illustrating an embodiment of the invention.

According to an embodiment shown in FIG. 2, an aircraft 20 comprises a fuselage 22, two wings 24 arranged on either side of the fuselage 22, and propulsion units 26 fixed below the wings 24. Each propulsion unit 26 comprises a nacelle 28 and a turbomachine 30 positioned inside the nacelle 28.

According to an embodiment visible in FIG. 3, the propulsion unit 26 comprises an air intake 28.1, a secondary exhaust duct 32 channeling a secondary flow of air, which is delimited by an inner wall 34 (also referred to as IFS for "inner fixed structure") and by an outer wall 36 (also referred to as OFS for "outer fixed structure"). According to one configuration, the air intake 28.1, the inner wall 34 or the outer wall 36 comprises at least one acoustic damping panel 38 which has an outer surface SE in contact with the secondary air flow and an inner surface SI opposite the outer surface SE.

Although it has been described as applying to a secondary exhaust duct 32, the invention is not limited to this application. Thus, the acoustic damping panel 38 can be positioned on any skin which has an outer surface SE in contact with an exterior environment Ext in which sound waves propagate during operation, such as for example a lip and an air inlet duct of an aircraft nacelle, a fan casing of an aircraft nacelle or any other surface of the propulsion unit 26 or aircraft 20. Irrespective of the configuration, the aircraft 20 comprises at least one acoustic damping panel 38.

According to an embodiment visible in FIG. 4, an acoustic damping panel 38 comprises, from the outer surface SE to the inner surface SI, a permeable structure 40, one face of which forms the outer surface SE, at least one alveolar structure 42 and a solid layer 44, one face of which forms the inner surface SI.

The solid layer 44 comprises at least one thin plate made of metal or composite material which is impermeable to sound waves.

The permeable structure 40, also called the acoustically resistive layer, may be made of metal or composite material and comprise one or more layer(s). The permeable structure 40 is permeable to at least one sound wave propagating into the external environment Ext.

The permeable structure 40 and the solid layer 44 are not described further here since they may be identical to those of the prior art.

According to a configuration visible in FIG. 4, the acoustic damping panel 38 comprises a single alveolar structure 42 between the permeable structure 40 and the solid layer 44. According to another configuration, the acoustic damping panel 38 comprises, between the permeable structure 40 and the solid layer 44, several alveolar structures 42 superposed on one another and separated by a permeable structure, also called a septum, or several juxtaposed alveolar structures 42.

Naturally, if a single alveolar structure 42 is provided, a thinner acoustic damping panel may be obtained.

The alveolar structure 42 extends between a first surface S1 in contact with or oriented towards the permeable structure 40, and a second surface S2 in contact with or oriented towards the solid layer 44. The alveolar structure 42 comprises a plurality of partitions 46 which each have a first edge 46.1 at the first surface S1, a second edge 46.2 at the second surface S2, and third and fourth edges 46.3, 46.4 (visible in FIG. 5) connecting the first and second edges 46.1, 46.2, which extend between the first and second surfaces S1, S2 and are substantially mutually parallel. The partitions 46 delimit between them cells 48 which are each open at a first end at the first surface S1, and at a second end at the second surface S2.

According to one configuration, the cells 48 have identical hexagonal cross-sections (in a transverse plane parallel to the first or second surface S1, S2). Thus the alveolar structure 42 forms a honeycomb. Of course, the invention is not limited to this configuration. The cells 48 may have different, non-hexagonal cross sections.

Irrespective of the configuration, the alveolar structure 42 has a plurality of cells 48, 48' separated by partitions 46 which each have a first edge 46.1 at the first surface S1, a second edge 46.2 at the second surface S2, and third and fourth edges 46.3, 46.4 connecting the first and second edges 46.1, 46.2; two adjacent partitions 46 are connected at their third and fourth edges 46.3, 46.4. The cells 48, 48' are dimensioned in volume so as to attenuate, using the Helmholtz resonator principle, a range of sound waves having relatively high frequencies situated in a range from 1,500 to 5,000 Hz.

According to an embodiment, the alveolar structure 42 has a volume mass of the order of 20 to 150 kg/m$^3$, partitions 46 which have a width W46 (dimension separating the third and fourth edges 46.3, 46.4) of the order of 4 to 20 mm and a length L46 (dimension separating the first and second edges 46.1, 46.2) of the order of 10 to 60 mm, and also hexagonal cells 48.

Each partition 46 has a first face F46 oriented towards a first cell 48, and a second face F46' oriented towards a second cell 48', a thickness E corresponding to a dimension separating the first and second faces F46, F46', a length L46 corresponding to a distance separating the first and second edges 46.1, 46.2, and a width W46 corresponding to a dimension separating the third and fourth edges 46.3, 46.4.

According to an embodiment, certain partitions 46, called single partitions, each comprise a single layer of material. Certain partitions 46, called double partitions, each comprise two layers of material glued together.

According to a characteristic of the invention, an acoustic damping panel, which is configured for damping at least one sound wave having a given sound frequency, comprises an alveolar structure 42 which comprises at least one attached element, separate from partitions 46 and configured for vibrating at a frequency substantially equal to the sound frequency of the sound wave to be damped. The phrase "substantially equal" means that the vibrational frequency lies in a frequency range of +/−10% of the sound frequency.

Thus as well as damping sound waves at high frequencies using the principle of a Helmholtz resonator, the alveolar structure 42 is configured for damping sound waves over another frequency range, in particular low frequencies, thanks to the vibrating attached elements.

Figures 5, 6, 7, 8:
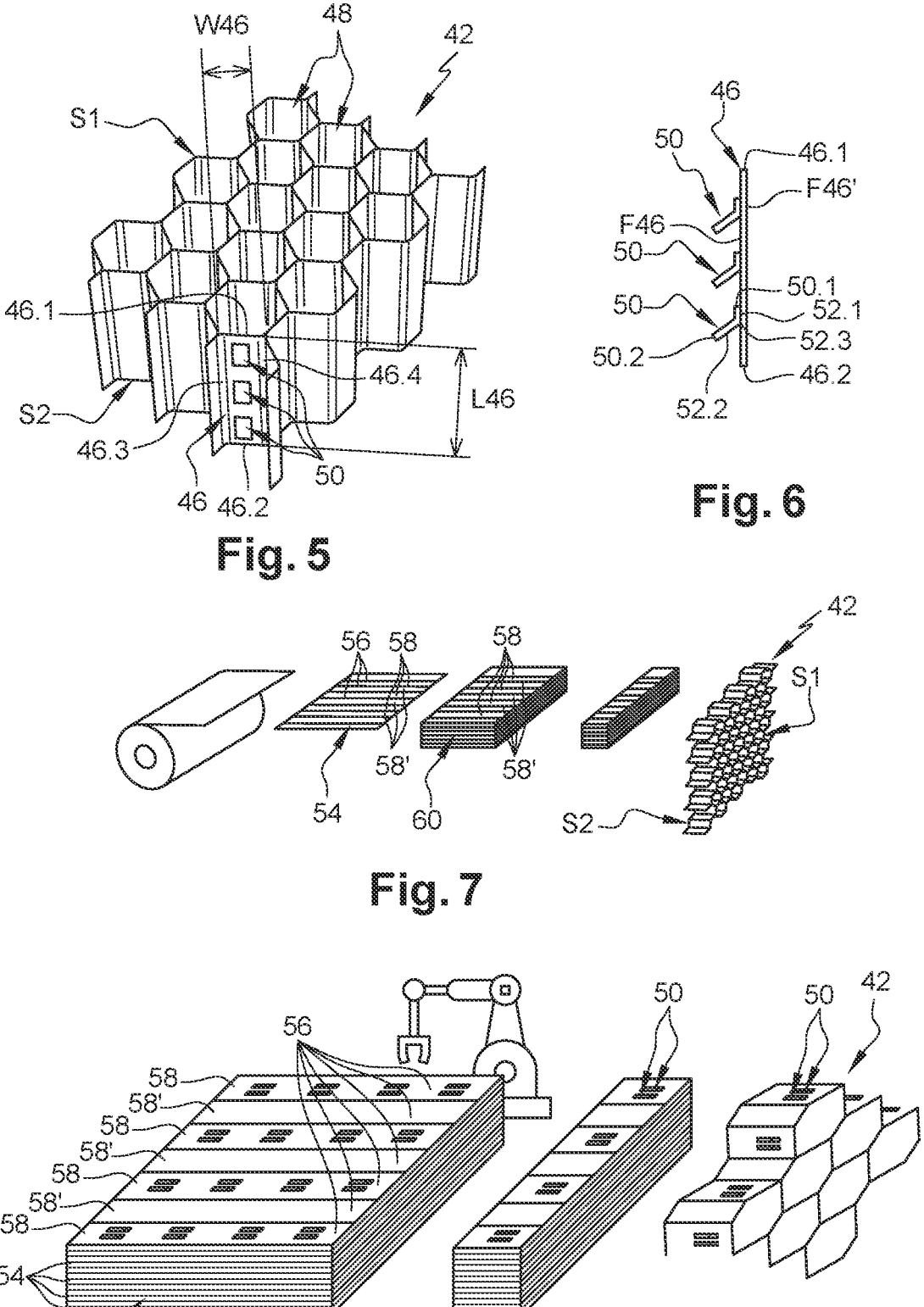
FIG. 5 is a perspective view of an alveolar structure comprising vibrating tabs, illustrating an embodiment of the invention.
FIG. 6 is a longitudinal sectional view of a partition of the alveolar structure visible in FIG. 5.
FIG. 7 is a schematic depiction of the various steps of a method for producing an alveolar structure.
FIG. 8 is a schematic depiction of the various steps of a method for producing an alveolar structure as visible in FIG. 5, illustrating an embodiment of the invention.

According to an embodiment visible in FIGS. 5, 6 and 8, the attached element is a tab 50 having a first end 50.1 connected to a partition 46 of the alveolar structure 42, and a free second end 50.2 configured for vibrating at a frequency substantially equal to a sound frequency of a sound wave to be damped.

Each tab 50 has a first part 52.1 pressed against and fixed to the partition 46 and extending from the first end 50.1, and a second part 52.2 detached from the partition 46 and extending from the second end 50.2, the first and second parts 52.1, 52.2 being separated by a fold line 52.3.

According to a configuration, all single partitions 46 of at least one considered zone of the alveolar structure 42 each comprise at least one tab 50.

According to an arrangement visible in FIGS. 5 and 6, the alveolar structure 42 comprises three tabs 50 fixed to the same partition 46 and aligned in a direction substantially parallel to the third or fourth edges 46.3, 46.4 of the partition 46, approximately centered between these third and fourth edges 46.3, 46.4 and evenly distributed between the first and second edges 46.1, 46.2.

According to an embodiment, each tab 50 is made of metal (such as an aluminum alloy for example) or composite material (based on aramid fibers for example), and has a thickness of the order of 50 to 500 µm. It has a constant width (dimension of the fold line 52.3) of the order of 10 to 90% of the width W46, and the second part 52.2 has a length (dimension between the fold line 52.3 and the second end 50.2) of the order of 5 to 80% of the length L46. Such a tab 50 vibrates at a frequency of the order of 500 to 1,500 Hz. Thus the acoustic damping panel 38 comprising at least one such tab 50 is configured for damping sound waves over two frequency ranges, namely high frequencies above 1,500 Hz and low frequencies of the order of 500 to 1,500 Hz.

Naturally, the invention is not limited to this number of tabs 50 per partition 46, or to the geometry, this arrangement or this material for the tabs 50. Thus the tabs may be attached to a single face F46, F46' of a partition 46, or to both faces.

Thus depending on the sound frequency of the sound wave to be damped, the person skilled in the art will determine the material, arrangement and geometry of the tabs 50 such that they vibrate at a vibrational frequency substantially equal to the sound frequency of the sound wave to be damped.

According to an embodiment visible in FIG. 7, a method for producing at least one alveolar structure 42 comprises a first step of cutting out rectangular sheets 54; a second step of folding the sheets 54 along the fold lines 56 corresponding to the third and fourth edges of the partitions 46 so as to obtain strips 58, 58' which correspond to the partitions 46 of the alveolar structure 42 to be obtained; a third step of gluing some strips 58' onto one or the other of the faces of each sheet 54, wherein even-numbered strips 58 (corresponding to single partitions 46) are not glued to either of the two faces of the sheets 54, while odd-numbered strips 58' (corresponding to double partitions 46) are glued alternately to the first face and then to the second face of the sheet 54; a step of stacking the sheets 54 so as to obtain a stack 60 of sheets 54; in some cases a fourth step of trimming the stack 60 to a dimension substantially equal to the length L46 of the partitions 46; and finally a final step of stretching the stack 60 so as to obtain the alveolar structure 42.

These various steps may be automated.

As illustrated in FIG. 8, the method for producing the alveolar structure 42 comprises a step of positioning the tabs 50, which step may be automated. According to an operating mode, this step may be carried out on each sheet 54 before the stacking step or alternately with the stacking step, the tabs 50 being positioned after depositing of a new sheet 54.

According to another embodiment visible in FIGS. 9 to 11, the attached element is a material strip 62 having two ends 62.1, 62.2 connected to the partitions 46 of the alveolar structure 42 and passing through at least one cell 48, said material strip 62 being configured for vibrating at a frequency substantially equal to the sound frequency of the sound wave to be damped.

This material strip 62 has upper and lower edges 64.1, 64.2 which are substantially parallel with one another and with the first and second edges 46.1, 46.2 of the partitions 46.

For each cell 48 of the alveolar structure 42 through which it passes, the material strip 62 comprises a curved central part 66.1 and first and second side parts 66.2, 66.3 which are flat and coplanar and arranged respectively between the first end 62.1 and the central part 66.1, and between the second end 62.2 and the central part 66.1. As a variant, the central part 66.1 forms a V-shape when viewed from above. Whatever variant is used, for each cell 48, the material strip 62 comprises an over-length between its first and second ends 68.1, 68.2, enabling it to vibrate. According to an operating mode, for each material strip 62, each central part 66.1 is obtained by folding.

According to a configuration, the alveolar structure 42 comprises a single material strip 62 positioned in a single cell 48. According to another configuration, the alveolar structure 42 comprises several material strips 62 passing through all cells 48 of at least one considered zone of the alveolar structure 42. As illustrated on FIGS. 9 and 11, a same material strip 62 may pass through several cells 48.

According to a configuration, each material strip 62 is approximately centered relative to the first and second edges 46.1, 46.2 of the partitions 46, and has a height (dimension measured perpendicularly to the upper and lower edges 64.1, 64.2) which is substantially equal to one third of the length L46 of the partitions 46. Each material strip 62 is made of metal (such as an aluminum alloy for example) or composite material (based on aramid fibers for example), and has a thickness of the order of 20 to 500 μm. For each cell 48, each material strip 62 comprises a semi-cylindrical central part 66.1 with an axis substantially parallel to the third and fourth edges 46.3, 46.4 of the partitions 46 and a radius of the order of 0.5 to 3 mm.

Such a material strip 62 is configured to vibrate at a frequency of the order of 500 to 1,500 Hz. Thus the acoustic damping panel 38 comprising at least one such material strip 62 is configured for damping sound waves having a frequency of the order of 500 to 1,500 Hz.

Of course, the invention is not restricted to this configuration for the material strips 62. Thus as illustrated in FIGS. 12 and 13, each material strip 62' is flat and has fringes 68 separated by straight cutouts 70 which are parallel with one another and with the third and fourth edges 46.3, 46.4 of the partitions 46, and which extend from a first edge of the upper and lower edges 64.1, 64.2 and are remote from a second edge, different from the first edge, of the upper and lower edges 64.1, 64.2.

Thus depending on the sound frequency of the sound wave to be damped, the person skilled in the art will determine at least one characteristic (location, geometry, material etc.) of at least one material strip 62, 62' such that it vibrates at a vibrational frequency substantially equal to the sound frequency of the sound wave to be damped.

Figures 14, 15, 16:
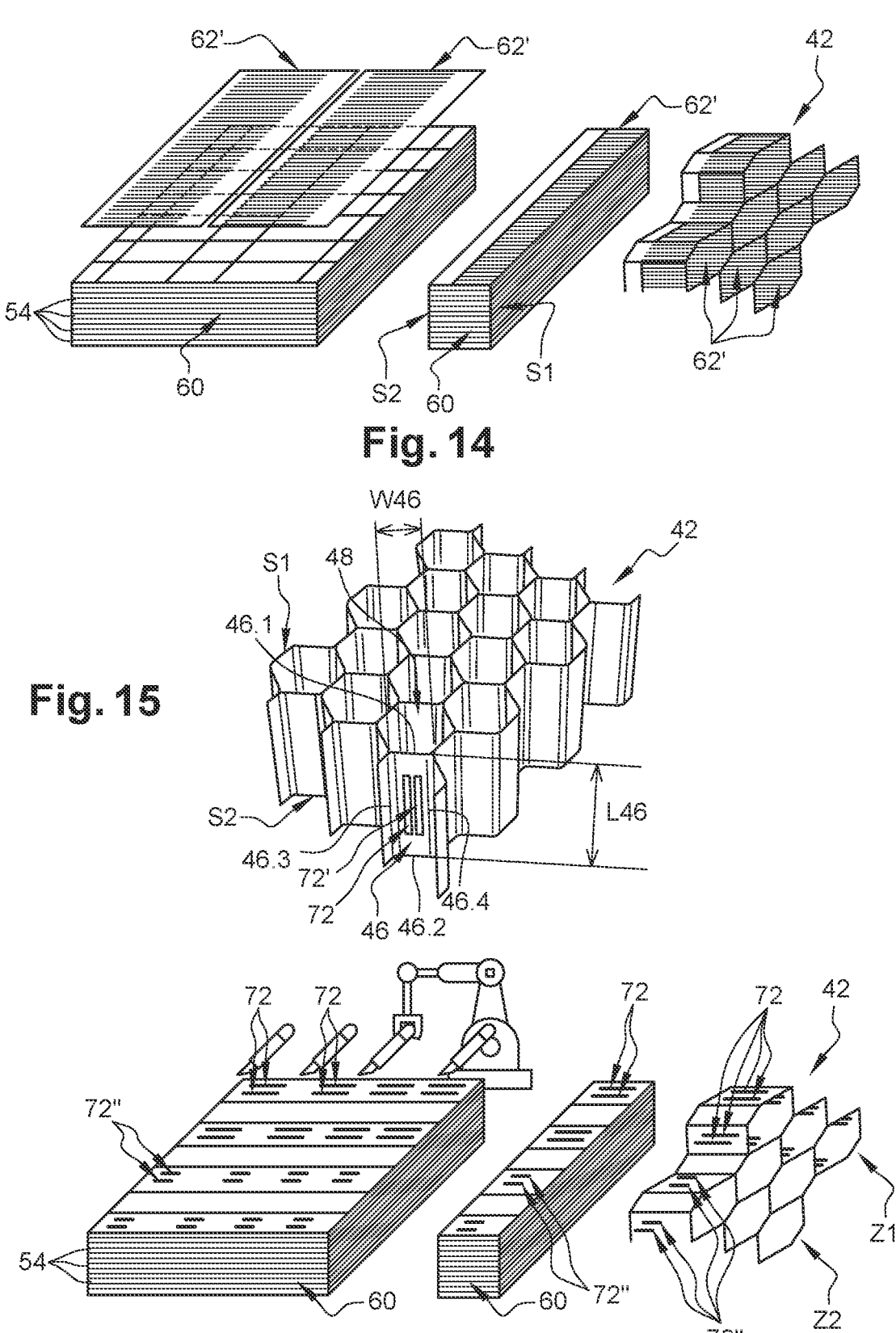
FIG. 14 is a schematic depiction of the various steps of a method for producing an alveolar structure as visible in FIG. 12.
FIG. 15 is a perspective view of an alveolar structure comprising partitions provided with cavities, illustrating an embodiment of the invention, and, FIG. 16 is a schematic depiction of the various steps of a method for producing an alveolar structure as visible in FIG. 15.

As illustrated in FIGS. 11 and 14, the method for producing the alveolar structure 42 comprises a step of positioning the material strips 62, 62', which step may be automated. According to an operating mode, the material strips 62, 62' are interposed between the sheets 54 during the stacking step.

Irrespective of operating mode, the method for producing the alveolar structure 42 comprises a step of positioning the attached elements 50, 62, 62', which step may be automated. According to an operating mode, this step may be carried out on each sheet 54 before the stacking step or alternately with the stacking step, the attached elements 50, 62, 62' being positioned after depositing of a new sheet 54.

According to an embodiment visible in FIG. 15, an acoustic damping panel, which is configured for damping at least one sound wave with a given sound frequency, comprises an alveolar structure 42 which comprises at least one partition 46 having at least one cavity 72 configured such that the partition 46 vibrates at a vibrational frequency substantially equal to the given sound frequency.

According to a non-limitative operating mode, each cavity 72 is obtained by material removal.

According to a configuration, each cavity 72 is remote from the first, second, third and fourth edges 46.1 to 46.4. However, at least one cavity 72 may extend up to at least one first edge of the first, second, third and fourth edges 46.1 to 46.4. For example, at least one cavity 72 may extend up to at least the first or second edge 46.1, 46.2.

According to a configuration, each cavity 72 is a blind cavity and opens only onto one of the first and second faces F46, F46' of the partition 46. According to another configuration visible in FIG. 15, each cavity 72 is a through cavity and opens onto the first and second faces F46, F46' of the partition 46.

According to a configuration, at least one partition 46 comprises a single cavity 72. According to another configuration, at least one partition 46 comprises several cavities 72.

According to an arrangement, all single partitions 46 of at least one considered zone of the alveolar structure 42 each comprise at least one cavity 72, 72'.

According to an embodiment, the alveolar structure 42 has a volume mass of the order of 20 to 150 kg/m$^3$, partitions 46 which have a width W46 of the order of 4 to 20 mm, and a length L46 of the order of 10 to 60 mm, and hexagonal cells 48 dimensioned to damp sound waves of a frequency situated in a range from 1,500 to 5,000 Hz.

At least some partitions, in particular the single partitions 46, each comprise two through cavities 72, 72' (connecting the first and second faces F46, F46') which each have a length L72, measured in a first direction parallel to the third and fourth edges 46.3, 46.4, of the order of 10 to 90% of the length L72, and a width W72, measured in a second direction parallel to the first and second edges 46.1, 46.2, of the order of 0.1 to 1 mm. The two cavities 72, 72' of a first partition 46 are offset relative to one another in the second direction, spaced apart by a distance of the order of 10 to 90% of the width W72, and are substantially centered relative to the first and second edges 46.1, 46.2 and relative to the third and fourth edges 46.3, 46.4. Such cavities 72, 72' allow the partition 46 to vibrate at a vibrational frequency of the order of 500 to 1,000 Hz.

Thus an alveolar structure 42 with cells 48 having a volume adapted for damping sound waves of a first frequency using the principle of a Helmholtz resonator comprises partitions 46, some of which each comprise a cavity 72 configured to enable said partitions to vibrate at a second frequency and thus damp sound waves of the second frequency.

Knowing the frequency of the sound wave to be damped and the characteristics of the partitions 46, including in particular the material, thickness, length and width, the person skilled in the art is able to determine the characteristics of the cavity (or cavities) 72, 72' to be produced on at least one partition 46 such that said partition 46 vibrates at a given frequency substantially equal to the frequency of the sound wave to be damped.

According to a configuration, all single partitions 46 vibrate and all have the same cavities 72, 72' and are all configured to vibrate at the same frequency.

According to another configuration visible in FIG. 16, the alveolar structure 42 has at least first and second zones Z1, Z2, at least one partition 46 of the first zone having at least one cavity 72 configured to allow the partition 46 of the first zone Z1 to vibrate at a first frequency, at least one partition 46 of the second zone having at least one cavity 72' configured to allow the partition 46 of the second zone Z2 to vibrate at a second frequency different from the first frequency.

According to an operating mode visible in FIG. 16, the method for producing the alveolar structure 42 visible in FIG. 15 comprises at least one step of producing cavities 72, 72', which may be carried out either before or after the step of stacking the sheets 54, in all cases before the step of stretching. When the cavities 72 are through cavities, the step of producing the cavities 72 is carried out after the step of stacking, so that cavities 72 are created simultaneously on several superposed sheets 54. The step of producing the cavities 72 may also be automated. As a non-limitative example, the step of producing the cavity 72 is carried out by an ultrasonic cutting process, an ultrasonic cutting head 74 being fixed to the end of an articulated arm 76.

According to an arrangement, the alveolar structure 42 comprises at least first and second zones, the first zone being configured for damping at least one sound wave having a first sound frequency, the second zone being configured for damping at least one sound wave having a second sound frequency different from the first sound frequency. In the first zone, the alveolar structure 42 comprises at least one attached element separate from the partitions 46, such as a tab 50, a material strip 62, 62' for example, configured for vibrating at a frequency substantially equal to the first sound frequency.

In the second zone, the alveolar structure 42 comprises at least one attached element separate from the partitions 46, such as a tab 50, a material strip 62, 62' for example, configured for vibrating at a frequency substantially equal to the second sound frequency, or at least one partition provided with at least one cavity 72 configured such that the partition vibrates at a frequency substantially equal to the second sound frequency.

Thus it is possible to design an alveolar structure which has a relatively small and constant thickness and several zones, each of which is designed to damp sound waves at a given frequency.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An alveolar structure of an acoustic damping panel which is configured for damping at least one sound wave of a sound frequency, the alveolar structure extending between first and second surfaces, the alveolar structure comprising:
   a plurality of cells separated by partitions which each have a first edge at the first surface, a second edge at the second surface, and third and fourth edges connecting the first and second edges, and,
   at least one attached element, separate from the partitions and configured for vibrating at a frequency substantially equal to the sound frequency of the at least one sound wave to be damped, the at least one attached element having a first part attached to a portion of the alveolar structure and a second part detached from the portion of the alveolar structure such that the at least one attached element vibrates at the frequency substantially equal to the sound frequency of the at least one sound wave to be damped.

2. The alveolar structure as claimed in claim 1, wherein the at least one attached element is a tab having a first end connected to a partition of the alveolar structure, and a free second end.

3. The alveolar structure as claimed in claim 2, wherein the alveolar structure comprises three tabs fixed to the same partition and aligned in a direction substantially parallel to the third and fourth edges of the partition, centered between the third and fourth edges of the partition and evenly distributed between the first and second edges.

4. The alveolar structure as claimed in claim 3, wherein the partitions each have a length measured in a direction parallel to the third and fourth edges, and a width measured in a direction parallel to the first and second edges,
   wherein each tab has a first part pressed against and fixed to the partition and extending from the first end, and a second part detached from the partition and extending from the second end, the first and second parts being separated by a fold line, and
   wherein each tab has a thickness between 50 to 500 μm, a constant width between 10 to 90% of the width of the partitions, the second part having a length between 5 to 80% of the length of the partitions.

5. An alveolar structure of an acoustic damping panel which is configured for damping at least one sound wave of a sound frequency, the alveolar structure extending between first and second surfaces, the alveolar structure comprising:
   a plurality of cells separated by partitions which each have a first edge at the first surface, a second edge at the second surface, and third and fourth edges connecting the first and second edges, and,
   at least one attached element, separate from the partitions and configured for vibrating at a frequency substantially equal to the sound frequency of the at least one sound wave to be damped, the at least one attached element having a first part attached to a portion of the alveolar structure and a second part detached from the portion of the alveolar structure such that the at least one attached element vibrates at the frequency substantially equal to the sound frequency of the at least one sound wave to be damped, wherein the at least one attached element is a tab having a first end connected to a partition of the alveolar structure, and a free second end, wherein the alveolar structure comprises single partitions each comprising a single layer of material, and double partitions each comprising two layers of material glued together, and wherein the single partitions of at least one cell of the alveolar structure each comprise at least one tab.

6. The alveolar structure as claimed in claim 1, wherein the attached element is a material strip having two ends connected to partitions of the alveolar structure and passing through at least one cell.

7. The alveolar structure as claimed in claim 6, wherein the material strip has upper and lower edges which are substantially parallel with one another and with the first and second edges of the partitions.

8. The alveolar structure as claimed in claim 6, wherein for each cell of the alveolar structure through which it passes, the material strip has an over-length allowing the material strip to vibrate.

9. The alveolar structure as claimed in claim 8, wherein each material strip has a height substantially equal to one third of a height of the partitions, and a thickness between 20 to 500 µm, each material strip having, in each cell through which the material strip passes, a curved central part and first and second side parts which are flat and coplanar and arranged on either side of the central part.

10. The alveolar structure as claimed in claim 6, wherein each material strip is flat and has fringes.

11. The alveolar structure as claimed in claim 6, wherein the alveolar structure comprises several material strips passing through all cells of at least one zone of the alveolar structure.

12. The alveolar structure as claimed in claim 1, wherein the alveolar structure comprises at least first and second zones, the first zone configured for damping at least one sound wave having a first sound frequency, the second zone being configured for damping at least one sound wave having a second sound frequency different from the first sound frequency, wherein the first zone comprises the at least one attached element.

13. The alveolar structure as claimed in claim 12, wherein at least one partition of the second zone has at least one cavity configured such that said partition of the second zone vibrates at a frequency substantially equal to the second sound frequency.

14. The alveolar structure as claimed in claim 12, wherein the alveolar structure comprises, in the second zone, at least one further attached element separate from the partitions and configured for vibrating at a frequency substantially equal to the second sound frequency.

15. A method for producing the alveolar structure as claimed in claim 1, the method comprising:
cutting out sheets,
folding and gluing the sheets,
stacking the sheets so as to obtain a stack of sheets, and stretching the stack so as to obtain the alveolar structure,
wherein the method comprises positioning separate elements on each sheet before the stacking step, or with the stacking step, and attaching the separate elements to form attached elements being positioned after depositing of a new sheet.

16. An acoustic damping panel comprising:
a permeable structure,
a solid layer, and
the alveolar structure according to claim 1 interposed between the permeable structure and the solid layer.

17. An aircraft comprising:
the acoustic damping panel as claimed in claim 16.

* * * * *